United States Patent [19]

Przewodek

[11] Patent Number: 5,669,590

[45] Date of Patent: Sep. 23, 1997

[54] RETAINING CLIP WITH MULTIPLE CLAMPS

[75] Inventor: Kevin Donald Przewodek, Northville, Mich.

[73] Assignee: Yazaki Corporation, Tokyo, Japan

[21] Appl. No.: 567,092

[22] Filed: Dec. 4, 1995

[51] Int. Cl.$^6$ ............................................. F16L 3/22
[52] U.S. Cl. .................. 248/68.1; 248/74.1; 248/74.2
[58] Field of Search ........................... 248/68.1, 74.1, 248/74.2

[56] References Cited

U.S. PATENT DOCUMENTS

| | | | |
|---|---|---|---|
| 3,521,332 | 7/1970 | Kramer | 24/81 |
| 3,894,706 | 7/1975 | Mizusawa | 248/68.1 |
| 4,244,542 | 1/1981 | Mathews | 248/68.1 X |
| 4,358,080 | 11/1982 | Wolker | 248/68.1 |
| 4,386,752 | 6/1983 | Pavlak et al. | 248/73 |
| 4,541,602 | 9/1985 | Potzas | 248/68.1 X |
| 4,550,891 | 11/1985 | Schaty | 248/74.2 X |
| 4,864,697 | 9/1989 | Sparks et al. | 248/68.1 X |
| 4,961,554 | 10/1990 | Smowton | 248/68.1 |
| 5,035,383 | 7/1991 | Rainville | 248/68.1 |
| 5,257,768 | 11/1993 | Juenemann et al. | 248/68.1 X |
| 5,263,671 | 11/1993 | Baum | 248/68.1 |

Primary Examiner—Alvin C. Chin-Shue
Assistant Examiner—Richard M. Smith
Attorney, Agent, or Firm—Young & Basile, P.C.

[57] ABSTRACT

A clip for securing together a plurality of elongated articles such as hoses or wire bundles has a plurality of separately formed clamps. Each clamp comprises first and second generally arcuate arms connected at their first ends by a V-shaped hinge and movable about the hinge between a circular closed position and an open position wherein the free ends of the arms are parted to allow an article to be placed into or removed from encirclement by the arms. A link member interconnects the hinges of the clamp to maintain the clamps in spaced relationship with one another and includes braces which add stiffness to the hinge and resist flattening of the V shape. The hinges and link member are of uniform cross sectional thickness so that stress concentrations are avoided. The clip is molded in the open position so that during installation it is not necessary to manually spread the arms in order to position them around an article.

7 Claims, 2 Drawing Sheets

RETAINING CLIP WITH MULTIPLE CLAMPS

FIELD OF THE INVENTION

This invention relates to clips for restraining elongated articles such as wires or hoses against movement, and more particularly to molded plastic clips for connecting two or more such articles to one another.

BACKGROUND OF THE INVENTION

Most automotive vehicles contain a number of electrical wiring bundles and fluid-carrying hoses. In routing hoses or electrical wiring through the interior of an automotive vehicle or other mechanical device, it is in some cases desirable to secure a first wire or hose to a second similar article at one or more points along their lengths. For example, it may be advantageous for a hose supplying brake fluid to a hydraulic powered brake to be routed alongside of a wire bundle leading to an electrical component near the brake.

Double ended clips have previously been used to connect two elongated articles. Japanese Patent Application 59-167428 discloses such a dual clip having two circular rings joined in a back-to-back fashion and sharing a common circumferential segment along their line of attachment. Each ring is split at a point diametrically opposite the shared segment to form two semicircular arms that may be spread apart at that point and placed around an article such as a wire bundle or hose. Latches disposed at the ends of the arms may be secured together to retain the ring in a closed position encircling the article. To avoid subjecting the rings to a high level of stress when in the closed position, the rings are molded or otherwise formed to assume the closed position when in an undeformed state. Accordingly, the arms must be manually spread apart to place them around an article. This makes the clip difficult to manipulate with one hand, as may be necessary if the articles to be connected are already installed in a vehicle and are positioned such that access to them is restricted.

U.S. Pat. No. 3,521,332 to Kramer discloses another double ended clip wherein two clip arms are pivotally joined at a point intermediate their ends by a resilient fulcrum to form a pair of generally arcuate gripping jaws at either end of the clip. The cross-sectional area of the fulcrum is less than that of the clip arms so that most of the relative motion between the gripping jaws is due to deformation of the fulcrum, and this results in the concentration of bending stresses in the fulcrum, a condition that makes the fulcrum prone to structural failure.

It would thus be desirable to provide a retaining clip that may be easily fastened around articles to be held, and that is not subjected to high levels of stress when in the closed configuration.

SUMMARY OF THE INVENTION

The present invention provides a molded plastic retaining clip having two or more interconnected clamps, each of which is attachable to a separate elongated article such as a hose or wire bundle to hold the articles in spaced relationship to one another.

Each clamp comprises a first and a second arm joined together at their respective first ends by a hinge and movable about the hinge between a closed position in which the free ends of the arms are relatively close together so that the arms may at least partially encircle one of the articles and an open position in which the free ends of the arms are relatively far apart to permit an article to be inserted into or withdrawn from encirclement by the arms. Latches are formed at the free ends of the arms and are engagable with one another to hold the arms in the closed position.

According to a feature of the invention, link means interconnects the hinges of each of the retaining clamps to hold the clamps in spaced relationship to one another. By forming the clip as two essentially discrete clamps joined by the link means, the stresses caused by movement of more than one of the clamps between the open and closed positions are not superimposed on one another in any portion of the clip, and thus overstressing of the clip is unlikely.

According to another feature of the invention, the hinge of each clamp is substantially V-shaped in cross section, with first and second branches of the V attached at their free ends to the first and second clamp arms respectively. Each branch of the hinge bears the stresses caused by movement of its respective arm substantially independently so that the stresses from the two arms are not superimposed upon one another and concentrated at a single location in the clamp.

According to yet another feature of the invention, the link means comprises spacer means interconnecting the apexes of each of the plurality of hinges and brace means connecting the branches of adjacent hinges with one another. The spacer means provides for general positioning of the clamps with respect to one another, while the brace means restrain against bending of the branches of each hinge toward one another when the arms are moved to the closed position. The brace means thus resist the flattening of the V shape of the hinges and so prevent the concentration of stresses at the apexes that would occur if the branches were allowed to bend inward.

According to a still further feature of the invention, the clip is molded so that the clamps, in their undeformed state, maintain an open position in which the distance between the free ends of the arms is greater than or equal to the diameter of the interior hole formed by the arms of the clamp when they are latched in the closed position. Accordingly, any article that is of the proper size to be retained inside of a clamp when it is latched in the closed position will also be able to fit through the gap without the need to spread the arms wider than their undeformed position. This feature makes the clip significantly easier and quicker to install as compared to prior art clips having an undeformed condition wherein the clamp is in a partially or fully closed position so that the installer must manipulate the clamp to an open position as it is placed around the article to be retained.

According to yet another feature of the invention, the hinge branches and the link means are formed integrally with one another and are of substantially equal thickness. This uniformity of thickness in the portions of the clip that bear the stresses caused by movement of the arms prevents the occurrence of stress concentrations that may lead to failure of the clip.

According to a further feature of the invention, the retaining clip is comprised of two retaining clamps disposed in substantially symmetrical back-to-back relationship. This dual-clip configuration is well adapted for use in many common automotive applications.

DETAILED DESCRIPTION OF THE PREFERRED EMBODIMENT

Figure 1:
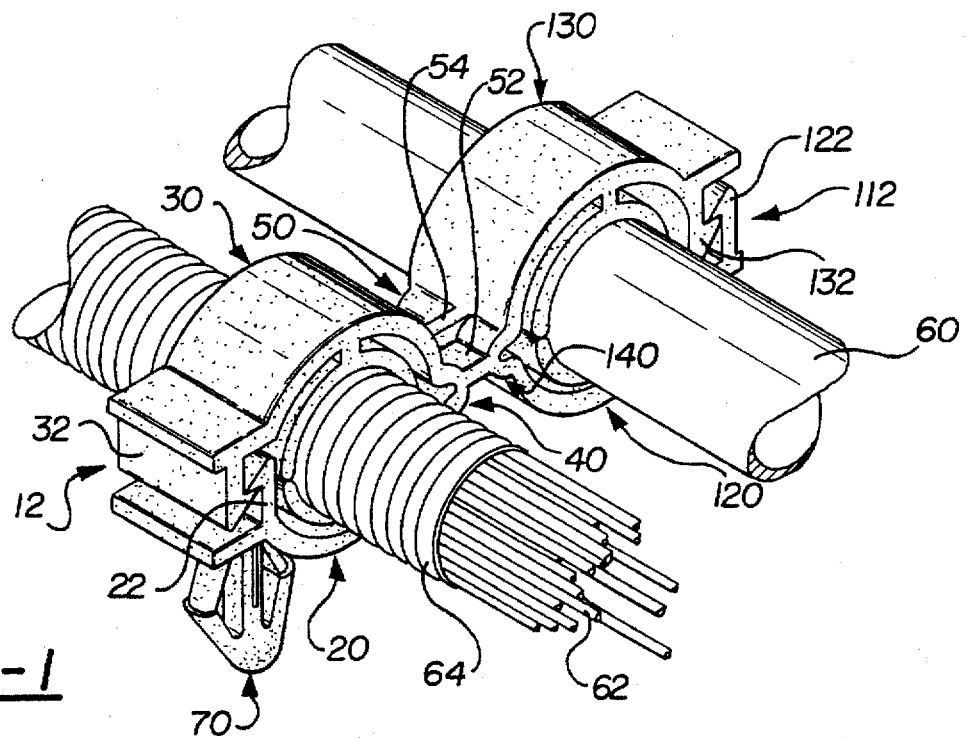
FIG. 1 is a perspective view of a double-ended clip according to the present invention with each clamp closed and latched around an article.
Figure 2:
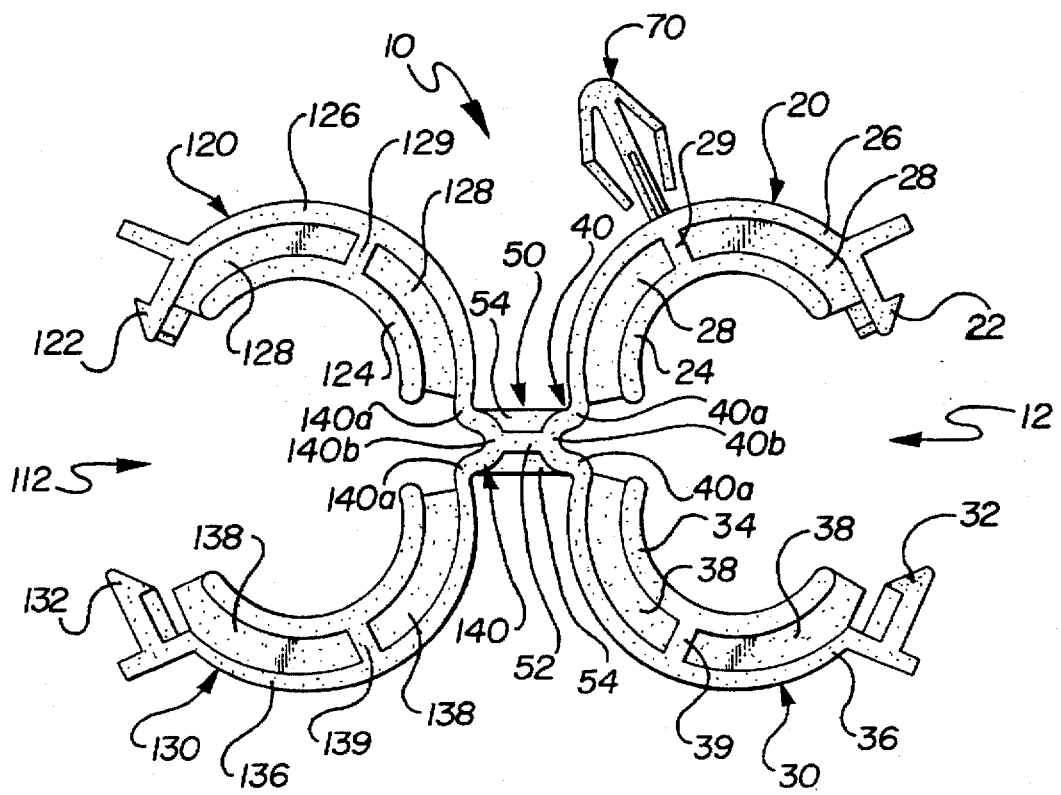
FIG. 2 is a side view of the clip of FIG. 1 with both clamps in the open position.
Figure 3:
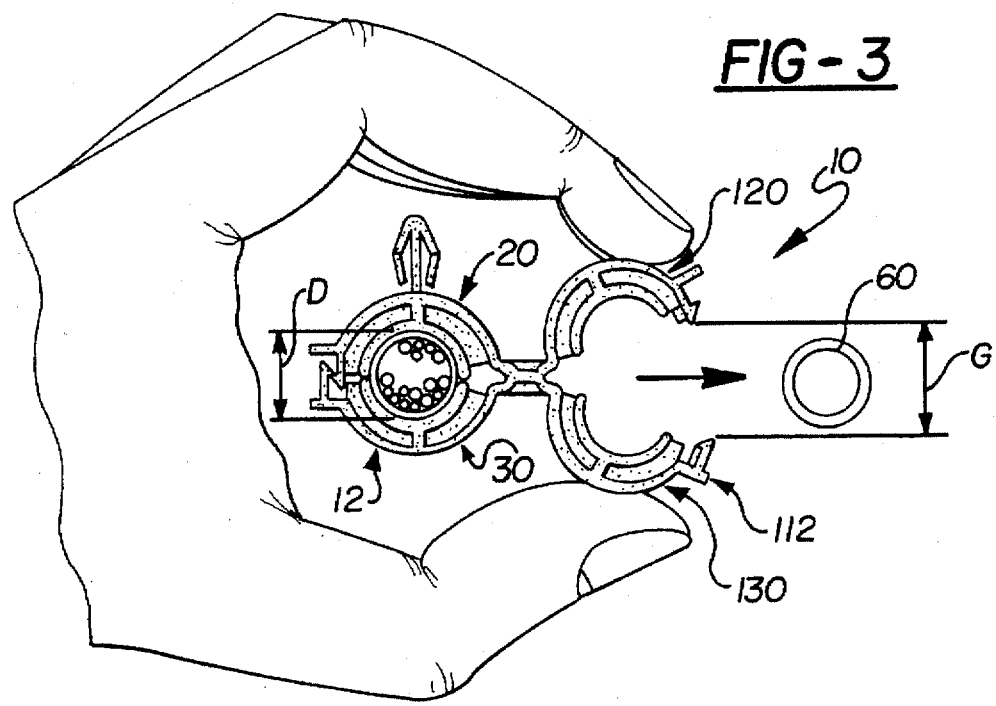
FIG. 3 is a side view of the clip of FIG. 1 with an installer's hand positioned in preparation of closing one of the clamps around an article.

As seen in FIG. 1–3, a double ended clip 10 according to the present invention comprises first and second retaining clamps 12, 112 connected in a substantially symmetric, back-to-back relationship with one another. Clamps 12, 112 are adapted to be placed around first and second elongated articles respectively while the clamps are in the open position shown in FIG. 2, and then moved to the closed position shown in FIG. 1. Clamps 12, 112 latch in the closed position to firmly hold the articles and maintain them in spaced relationship with one another. Examples of such elongated articles shown in FIG. 1 are a hose 60 and wire bundle 62 wrapped in a section of convolute tubing 64.

Clamps 12, 112 are substantially identical in structure and accordingly it is to be understood that the following description of the structure and functioning of clamp 12 also applies to clamp 112. Components of clamp 112 corresponding to those of clamp 12 are indicated by the addition of a leading digit 1 to the reference numeral. In the embodiment of the invention shown clamps 12, 112 are equal in size, although the clamps may be of different sizes if the diameters of the articles to be connected so require without departing from the scope of the invention. Clip 10 is preferably injection molded as a single, integral piece from a thermoplastic material and for reasons to be explained below is molded with both of clamps 12, 112 in the open position.

Clamp 12 comprises first and second semi-circular arms 20, 30 joined together at respective first ends by a hinge 40. Arms 20, 30 comprise inner flanges 24, 34, outer flanges 26, 36, and webs 28, 38 connecting respective inner and outer flanges to produce an I-beam type cross section. Integrally molded stiffener plates 29, 39 are located between the flanges on either side of web 28, 38 approximately midway along arms 20, 30 to provide additional stiffness to the arms.

Outer flanges 26, 36 should be sufficiently wide to allow the clip 10 to be easily handled and manipulated to the closed position by an installer having a normal level of manual dexterity. This width will vary with the particular application of the clip, but a width on the order of 0.25 inches to 0.50 inches has been found to be generally suitable. In the embodiment of the invention depicted inner flanges 24, 34 are equal in width to outer flanges 26, 36, however the inner flanges may be made wider if it is desired to provide for a greater area of contact between the inner flanges and the article being retained.

Hinge 40 is generally V-shaped in cross section, with two branches 40a of the V integrally connected to respective outer flanges 26, 36 along the full widths thereof and an apex 40b of the V pointing away from the arms. A link member 50 extends between and is integrally connected to hinges 40, 140 to maintain clamps 12, 112 in spaced, back-to-back relationship with one another. Link member 50 is made up of a spacer 52 joining the apexes 40b, 140b of the hinges along the full widths thereof, and a brace rib 54 projecting approximately perpendicularly from each side of the spacer. The ends of brace ribs 54 are joined with the outwardly facing surfaces of hinge branches 40a, 140a. Spacer 52, outer flanges 26, 36 and hinge branches 40a all have substantially the same thickness, as is best seen in FIG. 2.

Latching hooks 22, 32 are disposed at respective second ends of arms 20, 30 and are oriented oppositely to one another so as to be placed in locked engagement with one another when the arms are brought together to the closed position.

Clip 10 further includes an anchor 70 formed integrally with outer flange 26 to project outwardly therefrom. Anchor 70 is adapted to be forced through a hole in a panel or other structural component in the clip's operational environment and thereby fasten the clip thereto. The anchor 70 depicted is one of many designs of anchor means well known in the art, any of which may be used in conjunction with the invention clip.

Clip 10 is molded to have a natural, undeformed state wherein clamps 12, 112 are both in the open position shown in FIG. 2. In the undeformed open position, arms 20, 30 are spread sufficiently to create a gap G (see FIG. 3) between the second, latch-bearing ends of the arms having a width greater than or equal to the inside diameter D of the clamp interior hole when in the closed position. Accordingly, any article that is of the proper size to fit inside of inside diameter D when clamp 12 is latched in the closed position will also fit through gap G without the need for the installer of clip 10 to manually spread arms 20, 30 wider than their undeformed position. This feature makes clip 10 significantly easier and quicker to install as compared to prior art clips having an undeformed condition wherein the clamp is closed, or nearly closed, so that the installer must manipulate the clamp to an open position as it is placed around the article to be held.

Clamp 12 is sufficiently rigid to maintain the open position until a positive attempt is made by the installer to squeeze arms 20, 30 together by pressing inwardly on outer flanges 26, 36 with his/her fingers. When such an inwardly directed force is applied, arms 20, 30 rotate toward one another about hinge 40 until locking means 22, 32 snap into engagement with one another to hold the arms in the closed position.

The rotation of arms 20, 30 relative to hinge 40 is permitted by deformation of the clip structure occurring primarily in the vicinity of the juncture between outer flanges 26, 36 and hinge branches 40a. Due to the uniformity of the thicknesses of outer flanges 36, 46, hinge branches 40a, and spacer 52 the stresses induced by the deformation are spread relatively evenly throughout these portions of clip 10, there being no changes in thickness that would produce stress concentrations. The symmetry of link member 50 and hinges 40, 140 also contributes to the uniform distribution of stresses. The link member 50 also prevents twisting or bending of the clamps 12 and 112 relative to each other or toward each other.

As arms 20, 30 are moved to the closed position, an inward force is applied through outer flanges 26, 36 to hinge branches 40a which tends to bend the hinge branches toward one another and thus flatten the V shape of hinge 40. Brace ribs 54 resist this flattening and so prevent the concentration of stresses at apex 40b that would occur if hinge branches 40a were allowed to bend inward. Brace ribs 54 thus add to the stiffness of hinge 40, while also bearing a portion of the stress applied to the hinge and link member 50 due to movement of clamp 12 to the closed position.

Figure 4:
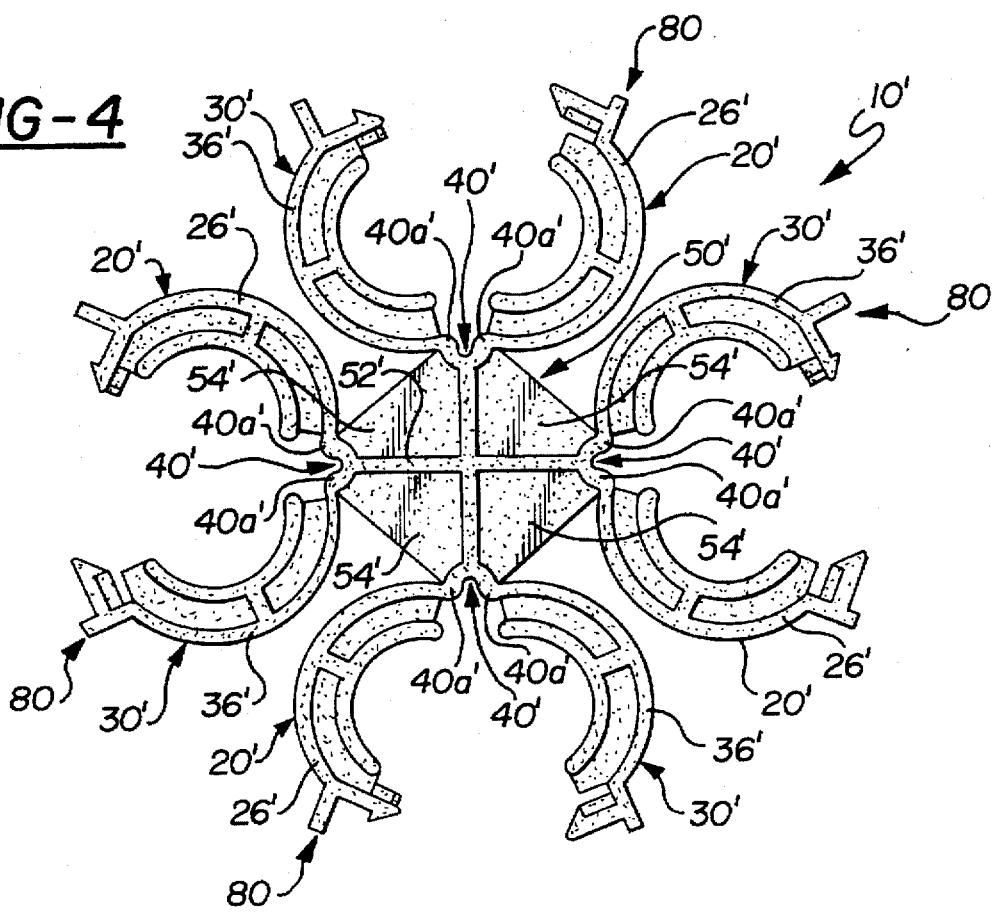
FIG. 4 is a side view of a quadruple-clip according to the present invention.

FIG. 4 depicts an alternative embodiment of the invention wherein a quadruple clip 10' has four clamps 80, each of which is adapted to engage a separate elongated article. Clamps 80 are essentially identical in structure to clamps 12, 112 described above, each comprising a pair of arms 20', 30' connected by a V-shaped hinge 40' for movement between an open and a closed position. A link member 50' connects clamps 80 and comprises a cross-shaped spacer 52' joined at each of its ends to a respective hinge apex 40a' and four triangular brace ribs 54' extending between and connected to the outer surfaces of adjacent hinge branches 40a'. As in the previously described double ended clip, hinge branches 40a', spacer 52' and outer flanges 26', 36' are all of uniform thickness, and clip 10' is molded or otherwise formed with arms 20', 30' of clamps 80 in the open position.

Quadruple clip 10' thus is usable to hold four articles in spaced relationship with one another while exhibiting the same features and advantages as are described above for double ended clip 10, and as such it should be apparent that the present invention is not limited to any particular number of clamps.

The above-described invention thus provides a multi-clamp restraining clip 10 that is formed with clamp arms 20, 30 in an open condition permitting it to be conveniently applied by hand to hold a plurality of elongated articles in spaced relationship to one another, and that is unlikely to fail due to overstressing caused by movement of the clamp arms to the closed and latched position. The formation of the invention clip as essentially discrete, separately movable clamps having V-shaped hinges joined by a link means provides a structure that prevents the stresses caused by movement of the arms of the individual clamps to the closed position from superimposing on one another and concentrating in a manner that could lead to failure of the clip. The uniform thickness of the critical portions of the hinge, arm, and link means along with provision of brace ribs 54 to restrain against flattening of the hinges when the arms are moved to the closed position also prevents concentration of stresses.

Whereas a preferred embodiment of the invention has been illustrated and described in detail, it will be apparent that various changes may be made in the disclosed embodiment without departing from the scope or spirit of the invention.

I claim:

1. A one-piece, molded plastic retaining clip for holding a plurality of articles in spaced relationship to one another, the clip comprising:

a plurality of retaining clamps, each clamp comprising a first and a second generally arcuate arm joined together at respective first ends by hinge means having an undeformed condition wherein the arms are in an open position in which second ends of the arms distal from the first ends are relatively far apart, the hinge means being elastically deformable to a deformed condition wherein the arms are in a closed position in which the second ends of the arms are relatively close together, the second ends of the arms having latching means molded integrally therewith and engagable with one another to hold the arms in the closed position; and spacer means interconnecting at least two of the hinge means and maintaining the at least two hinge means in spaced relationship to one another.

2. A retaining clip according to claim 1 wherein the hinge means of each clamp comprises a substantially V-shaped hinge having first and second branches joined at an apex, distal ends of the first and second branches being connected to the first and second arms respectively, and the spacer means interconnecting the apexes and maintaining the apexes in spaced relationship to one another.

3. A retaining clip according to claim 2 further comprising brace means connecting each branch of a hinge with an adjacent branch of an adjacent hinge, the brace means restraining the first and second branches of each hinge against movement toward one another.

4. A retaining clip according to claim 1 wherein when the arms of at least one clamp are in the open position the second ends of the arms are separated from one another by a gap distance, and when the arms of the at least one clamp are in the closed position the arms form a substantially circular interior hole having a diameter approximately equal to or smaller than the gap distance.

5. A retaining clip according to claim 2 wherein the hinge branches and the spacer means are formed integrally with one another and are of substantially equal thickness.

6. A retaining clip according to claim 1 having two retaining clamps disposed in substantially symmetrical back-to-back relationship.

7. A one-piece, molded plastic retaining clip for holding a plurality of articles in spaced relationship to one another, the clip comprising:

a plurality of retaining clamps, each clamp comprising a first and a second generally arcuate arm joined together at respective first ends by a hinge having a first and a second branch meeting at an apex, ends of the first and second branches distal from the apex being connected to the first and second arms respectively, the arms of each clamp movable about the hinge between a closed position in which second ends of the arms distal from the first ends are relatively close together and an open position in which the second ends of the arms are relatively far apart, the second ends of the arms having latching means molded integrally therewith and engagable with one another to hold the arms in the closed position;

spacer means interconnecting the apexes of at least two of the hinges and maintaining the apexes of the at least two hinges in spaced relationship to one another; and brace means connecting each branch of a hinge with an adjacent branch of an adjacent hinge, the brace means restraining the first and second branches of each hinge against movement toward one another.

* * * * *